United States Patent [19]

Price

[11] Patent Number: 4,493,330

[45] Date of Patent: Jan. 15, 1985

[54] TOBACCO STRIPPER AND GRADING MACHINE

[76] Inventor: Norris Price, Rte. 1, Surgoinsville, Tenn. 37873

[21] Appl. No.: 454,578

[22] Filed: Dec. 30, 1982

[51] Int. Cl.³ .............................................. A01D 45/16
[52] U.S. Cl. .................................................. 130/31 R
[58] Field of Search ................ 130/31 R, 30 R, 30 A; 56/27.5

[56] References Cited

U.S. PATENT DOCUMENTS

| | | | |
|---|---|---|---|
| 64,836 | 5/1867 | Campbell | 130/31 R |
| 1,518,349 | 12/1924 | Olson | 130/31 R |
| 2,989,056 | 6/1961 | La Motte | 130/31 R |
| 4,407,365 | 10/1983 | Patterson | 56/27.5 |
| 4,416,294 | 11/1983 | Turpin | 56/27.5 |

Primary Examiner—Jay N. Eskovitz
Attorney, Agent, or Firm—Leonard Bloom

[57] ABSTRACT

A device for grading and stripping tobacco leaves or the like from its associated stalk which includes a supporting instrumentality for holding the stalk and a plurality of partitions defining both the stalk support and the areas of demarcation between one section of the tobacco stalk and another which corresponds to different grades of tobacco, the partitions being adjustable on a supporting channel member. A stripping instrumentality is disposed on a housing within which resides an instrumentality for advancing the stalk, the stripping instrumentality and therefore the partitions in the direction of the stripper motion so that leaves retained adjacent the stripper instrumentality are already segregated according to grade.

14 Claims, 5 Drawing Figures

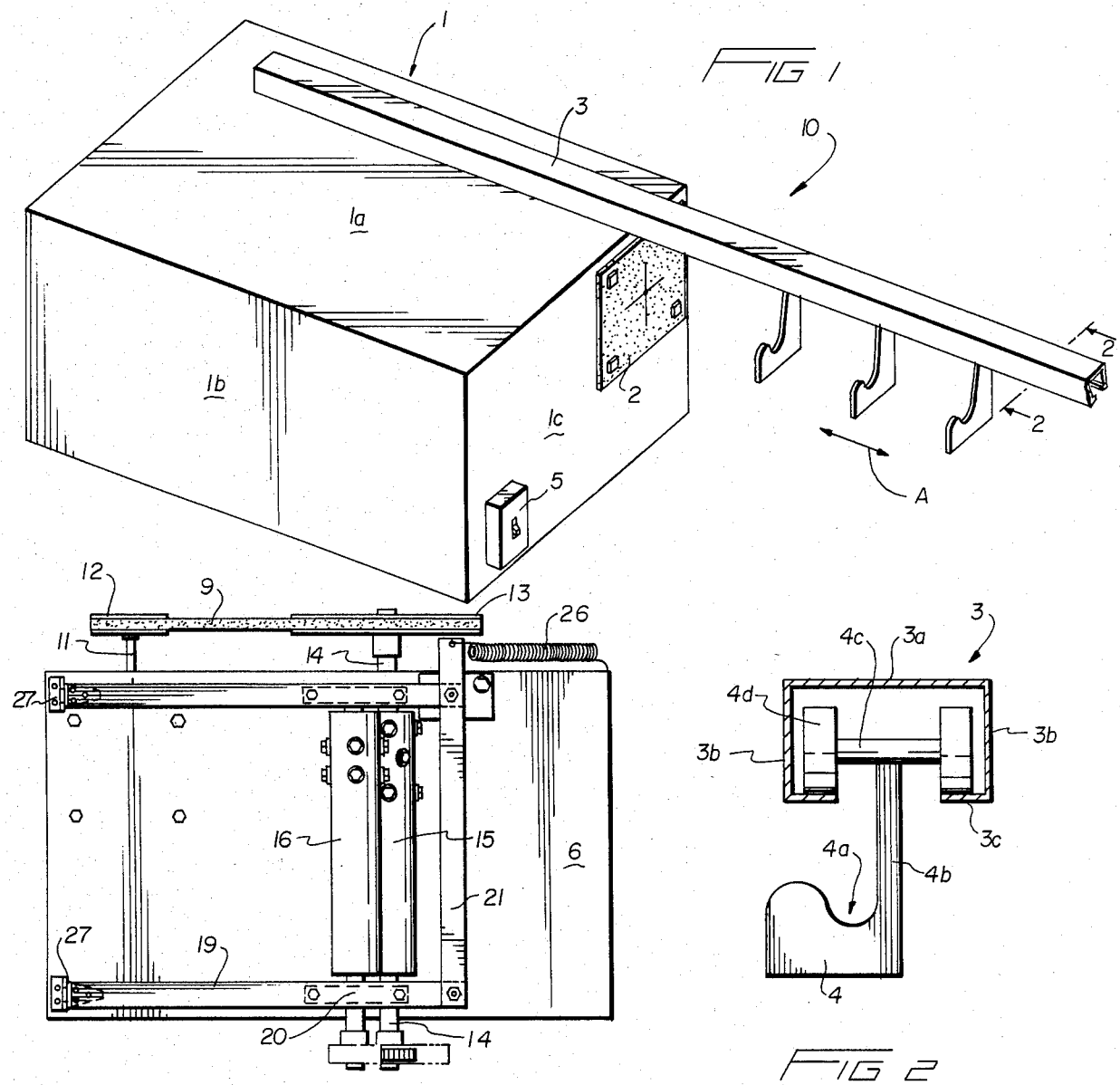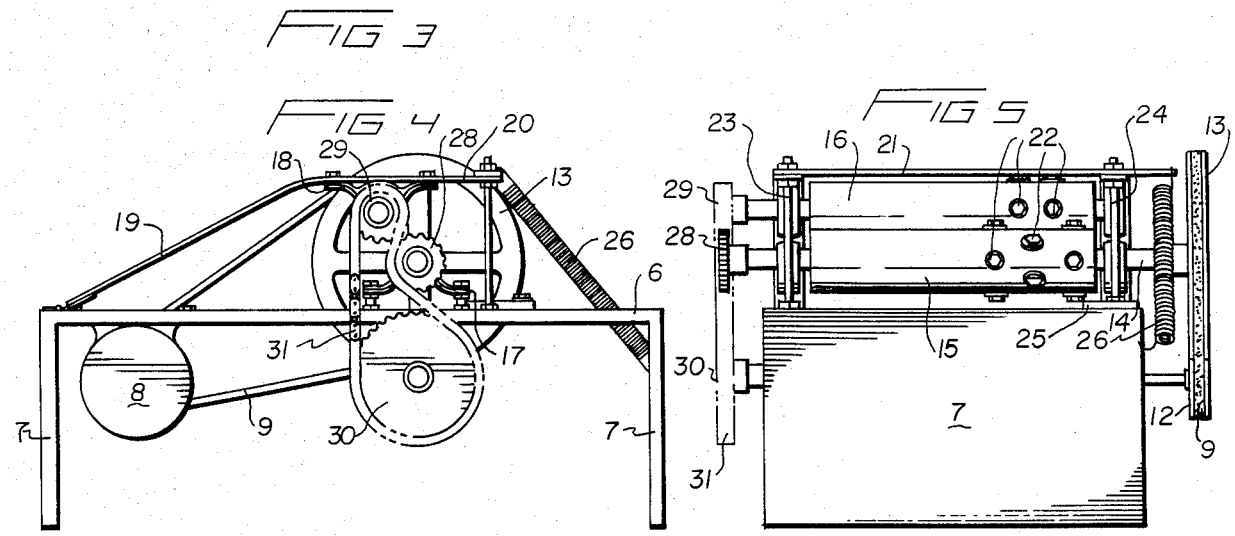

TOBACCO STRIPPER AND GRADING MACHINE

BACKGROUND OF THE INVENTION

This invention relates generally to devices for removing tobacco leaves or other leaves from the associated stalk upon which the leaf grows.

The resinous nature of the tobacco plant and hirsute nature makes the manual processing of the tobacco leaves an arduous task. More recently, however, buyers of tobacco have come to expect that the leaves be segregated by sorting, since the top most portion of the plant represents a finer product than either the middle portion or the lowermost portion thereof. Thus, for tobacco farmers to obtain the best price for their product, it is incumbent upon someone to separate the leaves from the stalk in such a manner that the grade that tobacco buyers demand are readily available so as to increase the profit earnings of the farmer.

Heretofore, known prior art exists for removing sections of a plant while growing so that leaves which ripen earlier than others on the stalk can be sequentially harvested and therefore sold already graded.

The following citations reflect the state-of-the-art of which applicant is aware insofar as these patents appear to be germane to the patent process:

U.S. Pat. No. 2,564,614, C. L. Sowers, Aug. 14, 1951;
U.S. Pat. No. 3,834,137, W. R. Long, Sept. 10, 1974;
U.S. Pat. No. 3,962,850, B. G. Moore, June 15, 1976;
U.S. Pat. No. 4,176,510, H. Griner et al., Dec. 4, 1979.

Three advertising brochures, also reflecting the state-of-the-art are identified as follows:

"Strip Master" Tobacco Equipment Co., Inc.
"Mechanical Tobacco Stripper" C. G. Dickenson, Distributor
"Tobacco Leaf Stripper" Sperry New Holland, printed 1981.

The patent to Moore and the patent to Long both teach the use of rotating blades which impact the leaves of the tobacco plant and thereby strip them from the plant. The patent to Griner et al. teaches the use of a similar apparatus where only the blades are hydraulically driven and coordinated with an endless belt. Moreover, these devices are only suitable for utilization in the field, which presents a coompletely different consideration than that which the instant application is directed to, since the instant application is used in stripping the tobacco once the stalks have been taken from the field and suitably cured.

The hereinabove mentioned three brochures show the state-of-the-art further demonstrate with manifest clarity that all of these machines are constrained to operate with manual separation after the stalk has had the leaves removed therefrom. Thus, the stripping operation occurs in one stage and manual sorting is required which can be seen to be labor intensive. Moreover, the specific stripper structure in the instant application cleans more of the tobacco leaves off of the plants than the prior art devices would suggest.

It should be apparent that all of the citations are substantially more complex than the structure according to the instant application, and none of these structures lends itself to the facile removal of the leaves from the stalk all at one time in such a manner that the leaves are automatically sorted and graded in one stripping operation, thereby reducing to a large extent the amount of work required by the person performing the stripping, and simultaneously reducing to a large extent the degree of manual contact that is required in performing the stripping operation.

It is evident that the instant application is distinguished over the known prior art by providing a mechanism which simultaneously strips and grades the leaves associated with the stalk in one operation which is of substantially straightforward mechanical design and therefore is reliable in service, a hallmark of good engineering, and provides the expeditious removal of leaves from the stalk in one simple operation.

Thus, an instrumentality has been provided which not only strips the tobacco leaves or the like from its associated stalk but also simultaneously grades the leaves by providing a support structure for the stalk which includes a plurality of adjustably mounted grading instrumentalities disposed on a stalk support instrumentality, the grading instrumentality serves as a plurality of partitions which segregate portions of the leaves on the stalk, and a stripping instrumentality adjacent one end of the stalk adapted to engage the stalk and pass same through a mechanism which advances the stalk automatically so that the leaves are retained on one side of the stripping instrumentality while the stalk itself passes therethrough and the leaves which are left behind are maintained segregated into different quality grades which provide for the farmer the most attractive price and provides for the buyer tobacco which has been reliably graded and therefore of greater value.

OBJECTS AND SUMMARY OF THE INVENTION

Accordingly, this invention has as an objective the provision of a new and novel device for grading and stripping tobacco leaves or the like from its associated stalk.

A further object of this invention contemplates providing a device as characterized above wherein the device is formed from readily available components oriented in a unique fashion to provide a device which is durable in construction and reliable in service.

A further object of this invention contemplates providing a device as characterized above which is extremely safe to use and poses no hazards for the person using the machine.

A further object of this invention is to provide a device as characterized above which is relatively inexpensive to maintain, and automatically adjusts and compensates for stalks of different dimensions.

A further object of this invention contemplates providing a device as characterized above in which the grading portion of the device is adjustable to readily allow the diverse size stalks and leaves having different attributes to be selectively culled in a single operation.

It is still yet a further object of this invention to provide a device as characterized above which lends itself to mass production techniques.

These and other objects will be made manifest when considering the following detailed specification taken in conjunction with the accompanying drawing figures wherein there has been illustrated a device for grading and then stripping tobacco leaves or the like from its associated stalk while maintaining the leaves segregated as graded. The device includes a supporting instrumentality upon which the stalk is initially disposed, a grading instrumentality disposed on the support instrumentality which is adjustably mounted thereon to serve as a plurality of partitions which segregate groups of the leaves on the stalk, and an instrumentality for stripping the leaves off of the stalk while allowing the partitions to preserve the leaves segregated as graded. The leaves operatively dissociated from the stalk so the tobacco leaves when associated from the stalk are already graded and ready for sale.

BRIEF DESCRIPTION OF THE DRAWINGS

FIG. 1 is a perspective view of the apparatus according to the present invention.

FIG. 2 is a sectional view taken along lines 2—2 of FIG. 1.

FIG. 3 is a top plan view of that which is shown in FIG. 1 with the protective housing removed.

FIG. 4 is side view of that which is shown in FIG. 3.

FIG. 5 is an end view of that which is shown in FIGS. 3 and 4.

BRIEF DESCRIPTION OF THE PREFERRED EMBODIMENT

Referring to the drawings now, wherein like reference numerals refer to like parts throughout the various drawing figures, reference numeral 10 is directed to the device for grading and then stripping tobacco leaves from its associated stalk according to the invention.

The stripper and grader 10 includes a protective shroud 1 having a top wall 1a, two spaced parallel side walls 1b and an end wall 1c together defining an enclosure under which the stripping machine is shielded so that the operator of the device is free from any worries as to having clothing or body parts engaged by the machine. An open bottom wall and an end wall remote from 1c allows access to the machine by removal through the open bottom wall, and egress of the stalks through the end wall opposite the wall 1c shown in FIG. 1.

The said end wall 1c has disposed in an upper right-hand corner thereof the stripping station which in a preferred form is constituted by a rubber mat 2 bolted to the end wall 1c by machines screws or the like and has a plurality of radially extending slits disposed centrally about a center hole, the rubber mat having sufficient memory to define a substantially planar surface unstressed, but when a stalk is placed through the center hole, the stalk is adapted to pass therethrough but the leaves stop at that area and stems of the leaves are retained in the slits. Preferably the rubber mat can be cut from a section of conveyor belt material having a plurality of laminations reinforced by meshed webbing of any material. Although one radial slit can retain the leaf stems, eight slits are preferred.

The stalk and the leaves themselves are supported by a channel member 3 which is fastened to the top 1a of the cover 1 and extends outwardly from the end wall 1c of the cover so that it substantially overlies the vertical slit of the cruciformed cut on the rubber mat 2. As shown in FIG. 2, the channel member 3 has a top wall 3a a pair of spaced opposed parallel side walls 3b and a pair of bottom shelves 3c turned inwardly from side walls 3b so as to support thereon the partitions 4 which serve to dynamically grade the tobacco as will be defined.

More particularly, the partitions 4 have a vertical stem 4b which has at an upper extremity two pairs of transverse axles on body 4c upon which two pairs of rollers 4d are disposed at extremities thereof and adapted to ride upon the inwardly turned bottom walls 3c of the channel member. Only one pair of rollers are shown for clarity, but the two pairs are interconnected by the body member 4c. The lowermost end of the partition 4 has a laterally extending hook member having a recess 4a upon which the stalk is adapted to be supported, the rollers 4d allow relative positioning of the partitions along the length of the channel member 3 as is readily evident. A plurality of such partitions are contemplated as being used in this device so that plural grades of tobacco can be derived from this stripping process. More particularly, the plural partitions 4 are caused to translate in the leftward direction of the arrow A when the stalk is advanced through the slited rubber mat 2 thereby allowing all partitions to move closer together separated only by the tobacco leaves that are entrained between adjacent partitions and held in the slits. An on-off power switch 5 is disposed on the end wall 1c, the power switch 5 is to be explained in more detail hereinbelow.

Referring now to FIGS. 3–5, the mechanism beneath the shroud 1 can now be readily understood. A support member having first and second parallel legs 7 is provided upon which a support shelf 6 is disposed, the support shelf 6 carrying thereon advancing rollers which encourage the axial translation of the stalk in a manner now to be defined.

First and second hinges 27 are disposed on the top shelf surface 6 to pivotally support an upwardly extending pair of suspension bars 19 disposed on an extremity of the support surface shelf 6 and extend upwardly to a substantially flat portion 20 as seen in FIG. 4. The terminal portions of the flat suspension bars 20 are constrained from downward vertical motion by means of first and second upstanding threaded rod 23, 24 so that an upper roller 16 depending from the flat bars 20 is limited in its negative or downward vertical motion. The upper roller 16 depends from the flat bars 20 by means of first and second bearing blocks 18 as shown in FIG. 4, and one end of a spindle upon which the roller 16 is supported includes a sprocket 29 for purposes to be assigned. The horizontal support surface 6 carries thereon a lower roller 15 similarly supported by bearing pair 17, and a further gear 28 is disposed in substantially the same vertical plane as the sprocket 29. The shaft 14 upon which the roller 15 is mounted has an end remote from the sprocket which extends beyond one of the side edges and communicates with a pulley 13 affixed thereon as by means of a key. The pulley 13 in turn is connected to a motor 8 and its output shaft 11 through a similar pulley 12 on shaft 11 by means of a belt 9 as best seen in FIG. 3. The two sprockets 28, 29 are interconnected by means of a chain 31 suitably looped over the upper sprocket 29 against sprocket 28 and over a lower idler sprocket 30 so that the two rollers rotate in opposite directions. More particularly, the upper roller 16 is preferred to rotate in a clockwise direction while the lower roller 15 is adapted to rotate in a counterclockwise direction. The idler sprocket 30 is supported on a bottom face of the support surface 6 by means of a shaft and bearing assembly (not shown). Surfaces of the rollers adjacent the pulleys are provided with a plurality of traction means thereon which in a preferred form are comprised of a plurality of sheet metal screws embedded into the rollers 15, 16 in which the exterior surface of the rollers is formed from a resilient material such as rubber. The sheet metal screws 22 are oriented so that the space between bands of screws on one roller mesh between the bands of screws on an adjacent roller so that the screws do not come into physical contact, but provide a tractive means for advancing the stalks therebetween.

It clear especially from FIG. 5, that the diameter of the stalk will cause some displacement between the two rollers and therefore the suspension mechanism finds particular utility in this device. More specifically, the two rods 23 and 24 allow the two suspension rods 19 and the flat portions 20 to raise up and down in conjunction with a transverse rod 21 which extends between termini of the flat portions 20 remote from the hinges 27, and a protruding end of rod 21 is provided with an orifice to hook a spring 26 from the end to a corner of the horizontal support surface 6 as shown in FIG. 3. Thus, a stalk entering the areas where the sheet metal screws 22 exist will cause displacement of one roller relative to the other at that area in a pivoting motion, but the end adjacent the sprockets 28 and 29 will be substantially unmoved so that the upper spindle supporting the roller 16 will pivot in an arcuate fashion. The spring 26, of course, allows the rollers to come back to their original position after the stalk has passed therethrough, and additionally allows stalks of different dimension to be accommodated. The threaded rod 24 is adjustably fastened to the rods 20, 21 and rests on a resilient pad 25 disposed on surface 6 for shock absorption reasons. The rod 23 is adjustably fastened between rods 20, 21 and surface 6 to fixedly orient the sprockets 28, 29, 30 and tension chain 31.

In use and operation, a stalk is supported on the partitions 4 as shown in FIG. 1, and the partitions are suitably oriented to allow various portions of the plant to extend therebetween. As the stalk is fed through the rubber mat 2 at the slit area, the partitions and the plant translate in the leftward direction of the arrow A and the stalk is threaded automatically between the upper and lower rollers 16, 15 as previously discussed, while the leaves are retained outside of the housing 1 and the stem of the leaf retained in the slit in such a manner that the lower, middle and top portions of the tobacco plant are provided with partitions so that the stripping and occurs and grading is maintained substantially automatically. If the channel member 3 is angulated from the horizontal plane, the partitions will slide back away from the slit by gravity and are ready for reuse by the next stalk.

Moreover, having thus described the invention, it should be apparent that numerous structural modifications are contemplated as being a part of this invention as set forth herein above and defined herein below by the claims.

What is claimed is:

1. A device for grading into two or more grades and then stripping tobacco leaves or the like from the associated stalk, the device comprising:
   support means supporting the stalk and including grading means movably mounted on said support means, said grading means including partitions which segregate respective groups of leaves on the stalk into corresponding grades,
   stripping means positioned adjacent to one end of said support means adapted to allow the stalk to pass therethrough but retain the leaves still segregated into grades by said partitions, and
   means for advancing the stalk through said stripping means, said grading means including said partitions with the respective groups of leaves being advanced toward said stripping means as the stalk advances and said grading means maintaining the groups of leaves segregated during stripping.

2. The device of claim 1, wherein said support means includes a channel member supported on the device within which a plurality of rollers are provided, said rollers having depending therefrom said partitions extending from an elongated slot on said channel member, said partitions including a hook shaped portion adapted to have the stalk disposed thereon along an appropriate axial length thereof so that the groups of leaves are segregated into grades.

3. The device of claim 2, wherein said stripping means includes a member of resilient material having a centrally disposed hole and at least one radial slit intersecting the hole through which the stalk of the plant is to pass, said member of resilient material having sufficient resiliency to strip the leaves from the stalk as the stalk passes therethrough and retain the leaves thereon.

4. The device of claim 3, wherein said means for advancing the stalk through said stripping means includes first and second rollers oriented to receive the stalk downstream from said stripping means, said first and second rollers being operatively driven to pass the stalk therebetween, and tractive means on said rollers for improving traction of the stalk as it passes through said rollers.

5. The device of claim 4, wherein said means for advancing said rollers further includes a motor, an output shaft from said motor, a pulley disposed on said output shaft, a further pulley disposed on one of said rollers connected to said first roller by belt means, spindles associated with said rollers having on an end opposite from said pulleys with sprocket means, and a chain means adapted to drive both of said rollers in opposite directions.

6. The device of claim 5, wherein said chain means includes an idler sprocket linking said two rollers together.

7. The device of claim 6, wherein said two rollers comprise and upper roller and a lower roller, and including suspension means supporting said upper roller of said two rollers in resilient relationship to said lower roller of said two rollers whereby stalks of various dimensions can be accommodated.

8. The device of claim 7, wherein said suspension means includes first and second pivoting arms interconnected at extremities remote from a pivot area and including a spring extending from a transverse arm to a frame to urge said suspension means in a direction opposite from the direction one of said two rollers translates upon reception of the stalk.

9. The device of claim 8, wherein said spring is connected to a supporting frame defined by a substantially planar horizontal supporting surface having first and second legs on opposed extremities thereof, said motor being attached to an underside of said horizontal support, and a pair of bearing blocks supporting said lower one of said two rollers on an upper face of said supporting surface.

10. The device of claim 9, wherein said suspension means has depending therefrom hinges defining said pivot area between first and second spaced rods and said horizontal supporting surface, said first and second spaced rods having a horizontal portion from which said pair of bearing blocks depends, and termimi of said horizontal portion having downwardly extending threaded rods which serve to stop downward vertical displacement of said suspension means.

11. The device of claim 10, including an on-off switch to selectively energize said motor.

12. The device of claim 11, in which said on-off switch is disposed on an outer shroud overlying said means for advancing, said shroud including a top wall, a pair of spaced parallel side walls depending from said top wall, and an end wall upon which said stripping means and said on-off switch are positioned.

13. The device of claim 12, in which said channel member is fixed to said top surface of said shroud.

14. The device of claim 13, in which said channel member has a substantially rectangular section including a top wall, a pair of spaced parallel side walls, and a bottom wall having said elongated slot therein and within which is disposed respective stems of said partitions, said stems communicating within an interior of said channel member by respective transverse shafts disposed respectively on terminal portions of said stems, and first and second rollers adapted to rotatably ride upon said bottom wall of said channel member, said partitions having respective hook shaped extremities lateraly extending from said stems and adapted to support the stalk thereon.

* * * * *